US012681836B2

(12) United States Patent
Liu

(10) Patent No.: US 12,681,836 B2
(45) Date of Patent: Jul. 14, 2026

(54) HEALTH DEGREE EVALUATION METHOD AND APPARATUS OF SOFTWARE PRODUCT

(71) Applicant: Beijing Volcano Engine Technology Co., Ltd., Beijing (CN)

(72) Inventor: Jianhui Liu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/820,730

(22) Filed: Aug. 30, 2024

(65) Prior Publication Data

US 2025/0077388 A1 Mar. 6, 2025

(30) Foreign Application Priority Data

Aug. 30, 2023 (CN) .......................... 202311110201.2

(51) Int. Cl.
*G06F 11/00* (2006.01)
*G06F 11/3604* (2025.01)

(52) U.S. Cl.
CPC ................................ *G06F 11/3612* (2013.01)

(58) Field of Classification Search
CPC .................................................. G06F 11/3612
See application file for complete search history.

(56) References Cited

U.S. PATENT DOCUMENTS

2021/0295223 A1* 9/2021 Freeman ............. G06F 11/3428

FOREIGN PATENT DOCUMENTS

| CN | 109408364 A | 3/2019 |
| CN | 109472312 A | 3/2019 |
| CN | 111950839 A | 11/2020 |
| CN | 113849387 A | 12/2021 |
| CN | 116051209 A | 5/2023 |

OTHER PUBLICATIONS

First Office Action for Chinese Application No. 202311110201.2, mailed Apr. 30, 2025, 19 pages.

* cited by examiner

*Primary Examiner* — Amine Riad
(74) *Attorney, Agent, or Firm* — Alleman Hall LLP

(57) ABSTRACT

The present application discloses a health degree evaluation method of a software product. For a software product to be evaluated, a usage condition of using the software product to be evaluated by a client may represent a health degree of the software product to be evaluated. Therefore, when the health degree of the software product to be evaluated is evaluated, usage parameters for target clients to use the software product to be evaluated may be obtained, the usage parameters may represent the condition of usage by target clients of the software product to be evaluated, wherein the usage parameters may include at least two of a usage depth parameter, a usage breadth parameter and a usage frequency parameter. After the usage parameters is obtained, the health degree of the software product to be evaluated may be determined according to the usage parameters.

18 Claims, 3 Drawing Sheets

S101

Obtain usage parameters of target clients using a software product to be evaluated, wherein the usage parameters includes at least two of: a usage depth parameter, a usage breadth parameter and a usage frequency parameter, the usage depth parameter is determined according to conditions of functions of the software product to be evaluated used by the target client, the usage breadth parameter is determined according to the number of users in the target clients who use the software product to be evaluated, and the usage frequency parameter is determined according to a frequency of the target client using the software product to be evaluated

S102

Determine a health degree of the software product to be evaluated according to the usage parameters

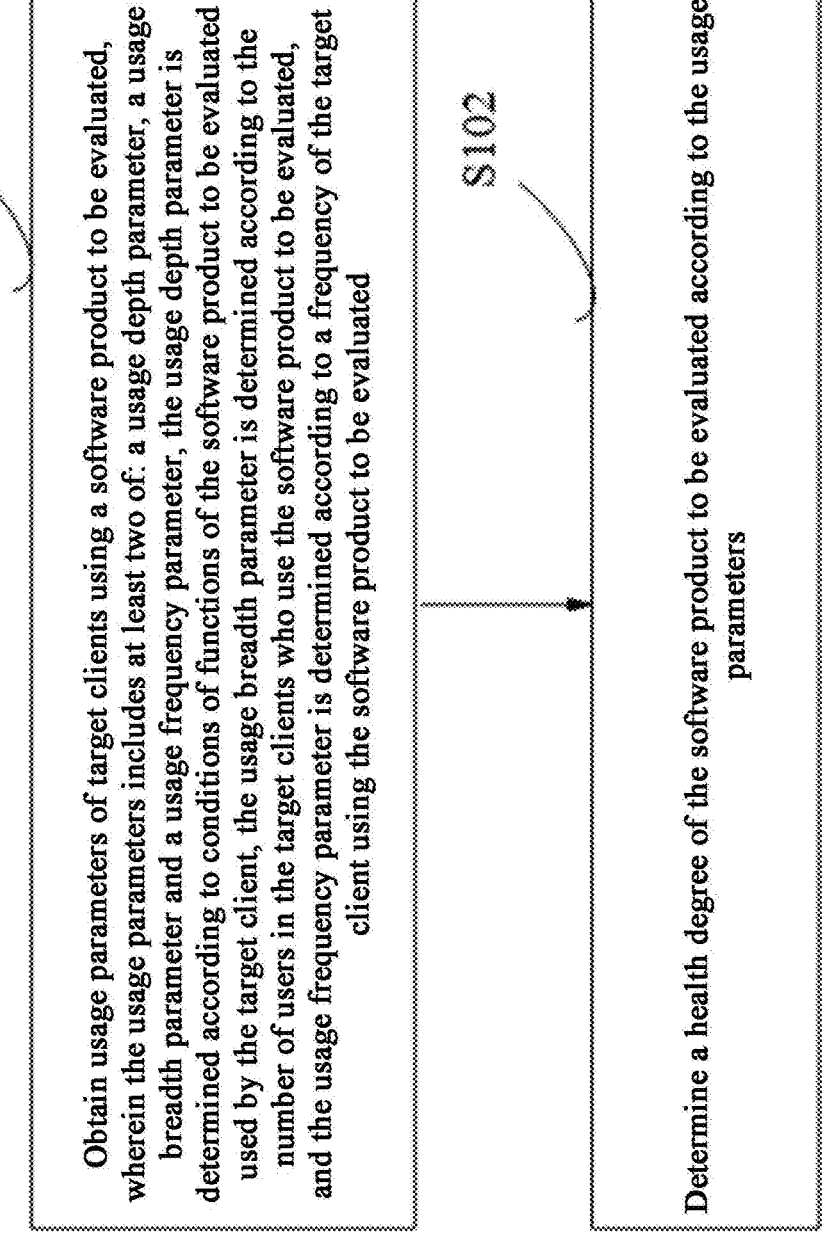

S101

Obtain usage parameters of target clients using a software product to be evaluated, wherein the usage parameters includes at least two of: a usage depth parameter, a usage breadth parameter and a usage frequency parameter, the usage depth parameter is determined according to conditions of functions of the software product to be evaluated used by the target client, the usage breadth parameter is determined according to the number of users in the target clients who use the software product to be evaluated, and the usage frequency parameter is determined according to a frequency of the target client using the software product to be evaluated

S102

Determine a health degree of the software product to be evaluated according to the usage parameters

FIG. 1

```
CREATE TABLE events_all (
    `APP_name`     String DEFAULT "     COMMENT 'Application name',
    `user_id`      String DEFAULT "     COMMENT 'User id',
    `module`       String DEFAULT "     COMMENT 'Function',
    `time`         UInt64               COMMENT 'Usage time, accurate to milliseconds',
    `action`       String               COMMENT 'Usage action', )
```

HEALTH DEGREE EVALUATION METHOD AND APPARATUS OF SOFTWARE PRODUCT

CROSS-REFERENCE TO RELATED APPLICATION(S)

This application claims priority to Chinese Application No. 202311110201.2 filed in Aug. 30, 2023, the disclosure of which is incorporated herein by reference in its entirety.

FIELD

The present application relates to the technical field of computers, and in particular to a health degree evaluation method and apparatus of a software product.

BACKGROUND

With the development of computer technologies, more and more software products appear. For example, with the development and popularization of cloud computing and the advent of the industry Internet era, more and more software as a service (software as a service) applications appear to provide convenient software services for enterprises and personal clients.

It is particularly important to determine health degrees of the software products, and the health degrees of the software products may be used for indicating operation conditions of the software products, which may be used as an important reference factor for software product providers to optimize the software products.

How to determine the health degrees of the software products is a problem to be solved at present.

SUMMARY

In order to solve or at least partially solve the above technical problems, embodiments of the present application provide a health degree evaluation method and apparatus of a software product.

In a first aspect, an embodiment of the present application provides a health degree evaluation method of a software product, including:

obtaining usage parameters for target clients to use a software product to be evaluated, wherein the usage parameters includes at least two of a usage depth parameter, a usage breadth parameter and a usage frequency parameter, the usage depth parameter is determined according to conditions of usage by the target clients of functions of the software product to be evaluated, the usage breadth parameter is determined according to a number of users who use the software product to be evaluated in the target client, and the usage frequency parameter is determined according to a frequency of the target clients using the software product to be evaluated; and determining a health degree of the software product to be evaluated according to the usage parameters.

Optionally, the usage depth parameter is determined according to a ratio of functions that have been used by the target clients to functions provided by the software product to be evaluated.

Optionally, each of the functions provided by the software product to be evaluated is set with a corresponding weight, and the usage depth parameter is determined according to the functions that have been used by the target clients in the functions provided by the software product to be evaluated, and the weights of the functions that have been used by the target client.

Optionally, an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

Optionally, the usage breadth parameter is determined according to a ratio of the number of users who actually use the software product to be evaluated in the target clients to the total number of users who are able to use the software product to be evaluated in the target client.

Optionally, the number of users is the number of users who actually use the software product to be evaluated in the target clients within a first time period, the total number of users is the number of users who actually use the software product to be evaluated in the target clients within a second time period, and a duration corresponding to the first time period is less than a duration corresponding to the second time period.

Optionally, the usage frequency parameter is determined according to the number of days when the target clients actually uses the software product to be evaluated within a third time period.

Optionally, determining the health degree of the software product to be evaluated according to the usage parameters includes:

performing weighted summation on respective parameters included in the usage parameters to obtain a health degree score of the software product to be evaluated.

Optionally, the method further includes:

receiving a usage record of the target clients using the software product to be evaluated, which is reported by the software product to be evaluated, and converting the usage record into a storage format supported by a database, so as to store the usage record in the database;

wherein obtaining the usage parameters of the target clients using the software product to be evaluated includes:

obtaining, from the database, a target usage record of the target clients using the software product to be evaluated, wherein the target usage record is some or all usage records stored in the database; and obtaining the usage parameters of the software product to be evaluated according to the target usage record.

Optionally, the method further includes:

obtaining one or more of a satisfaction degree of the target clients to the software product to be evaluated, a service-level agreement of the software product to be evaluated, and a consultation amount of consulting the software product to be evaluated by the target client, wherein determining the health degree of the software product to be evaluated according to the usage parameters includes:

determining the health degree of the software product to be evaluated according to the usage parameters, and one or more of the satisfaction degree of the target clients to the software product to be evaluated, the service-level agreement of the software product to be evaluated, and the consultation amount of consulting the software product to be evaluated by the target client.

In a second aspect, an embodiment of the present application provides a health degree evaluation apparatus of a software product, including:

a first acquisition unit, configured to obtain usage parameters of using a software product to be evaluated by target clients, wherein the usage parameters includes at least two of a usage depth parameter, a usage breadth parameter and a usage frequency parameter, the usage depth parameter is determined according to conditions of usage by the target clients of functions of the software product to be evaluated, the usage breadth parameter is determined according to the number of users who use the software product to be evaluated in the target client, and the usage frequency parameter is determined according to a frequency of the target clients using the software product to be evaluated; and a determination unit, configured to determine a health degree of the software product to be evaluated according to the usage parameters.

Optionally, the usage depth parameter is determined according to a ratio of functions that have been used by the target clients to functions provided by the software product to be evaluated.

Optionally, each of the functions provided by the software product to be evaluated is set with a corresponding weight, and the usage depth parameter is determined according to the functions that have been used by the target clients in the functions provided by the software product to be evaluated, and the weights of the functions that have been used by the target client.

Optionally, an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

Optionally, the usage breadth parameter is determined according to a ratio of the number of users who actually use the software product to be evaluated in the target clients to the total number of users who are able to use the software product to be evaluated in the target client.

Optionally, the number of users is the number of users who actually use the software product to be evaluated in the target clients within a first time period, the total number of users is the number of users who actually use the software product to be evaluated in the target clients within a second time period, and a duration corresponding to the first time period is less than a duration corresponding to the second time period.

Optionally, the usage frequency parameter is determined according to the number of days when the target clients actually uses the software product to be evaluated within a third time period.

Optionally, the determination unit is configured to:

perform weighted summation on respective parameters included in the usage parameters to obtain a health degree score of the software product to be evaluated.

Optionally, the apparatus further includes:

a receiving unit, configured to receive a usage record of the target clients using the software product to be evaluated, which is reported by the software product to be evaluated, and convert the usage record into a storage format supported by a database, so as to store the usage record in the database;

wherein the first acquisition unit is configured to:

obtain, from the database, a target usage record of the target clients using the software product to be evaluated, wherein the target usage record is some or all usage records stored in the database; and obtain the usage parameters of the software product to be evaluated according to the target usage record.

Optionally, the apparatus further includes:

a second acquisition unit, configured to obtain one or more of a satisfaction degree of the target clients to the software product to be evaluated, a service-level agreement of the software product to be evaluated, and a consultation amount of consulting the software product to be evaluated by the target client, wherein the determination unit is configured to:

determine the health degree of the software product to be evaluated according to the usage parameters, and one or more of the satisfaction degree of the target clients to the software product to be evaluated, the service-level agreement of the software product to be evaluated, and the consultation amount of consulting the software product to be evaluated by the target client.

In a third aspect, an embodiment of the present application provides an electronic device, including a processor and a memory, wherein, the processor is configured to execute an instruction stored in the memory, so that the device is caused to execute the method according to any one of the first aspect.

In a fourth aspect, an embodiment of the present application provides a computer-readable storage medium, including an instruction, wherein the instruction instructs a device to execute the method according to any one of the first aspect.

In a fifth aspect, an embodiment of the present application provides a computer program product, wherein when the computer program product runs on a computer, the computer is caused to execute the method according to any one of the first aspect.

Compared with the prior art, the embodiments of the present application have the following advantages:

The embodiments of the present application provide a health degree evaluation method of a software product. For the software product to be evaluated, the usage condition of the software product to be evaluated of the client may represent the health degree of the software product to be evaluated. Therefore, in the embodiments of the present application, when the health degree of the software product to be evaluated is evaluated, the usage parameters of using the software product to be evaluated by a target user may be obtained, the usage parameters may represent the usage condition of the target clients using the software product to be evaluated, wherein the usage parameters may include at least two of the usage depth parameter, the usage breadth parameter and the usage frequency parameter. Because the usage parameters may represent the usage condition of the target clients using the software product to be evaluated, and the usage condition of the target clients using the software product to be evaluated may reflect the health degree of the software product to be evaluated, so after the usage parameters is obtained, the health degree of the software product to be evaluated may be determined according to the usage parameters. Therefore, by using the solutions of the embodiments of the present application, the health degree of the software product to be evaluated may be determined in combination with at least two of the usage depth parameter, the usage breadth parameter and the usage frequency parameter, so that the determined health degree is more accurate.

BRIEF DESCRIPTION OF THE DRAWINGS

To illustrate technical solutions in the embodiments of the present application or in the prior art more clearly, a brief introduction on the drawings which are needed in the description of the embodiments or the prior art is given below. Apparently, the drawings in the description below are merely some of the embodiments of the present application, based on which other drawings may be obtained by those ordinary skilled in the art without any creative effort.

FIG. 1 is a schematic flowchart of a health degree evaluation method of a software product provided in an embodiment of the present application;

DETAILED DESCRIPTION OF EMBODIMENTS

Figures 2, 3:
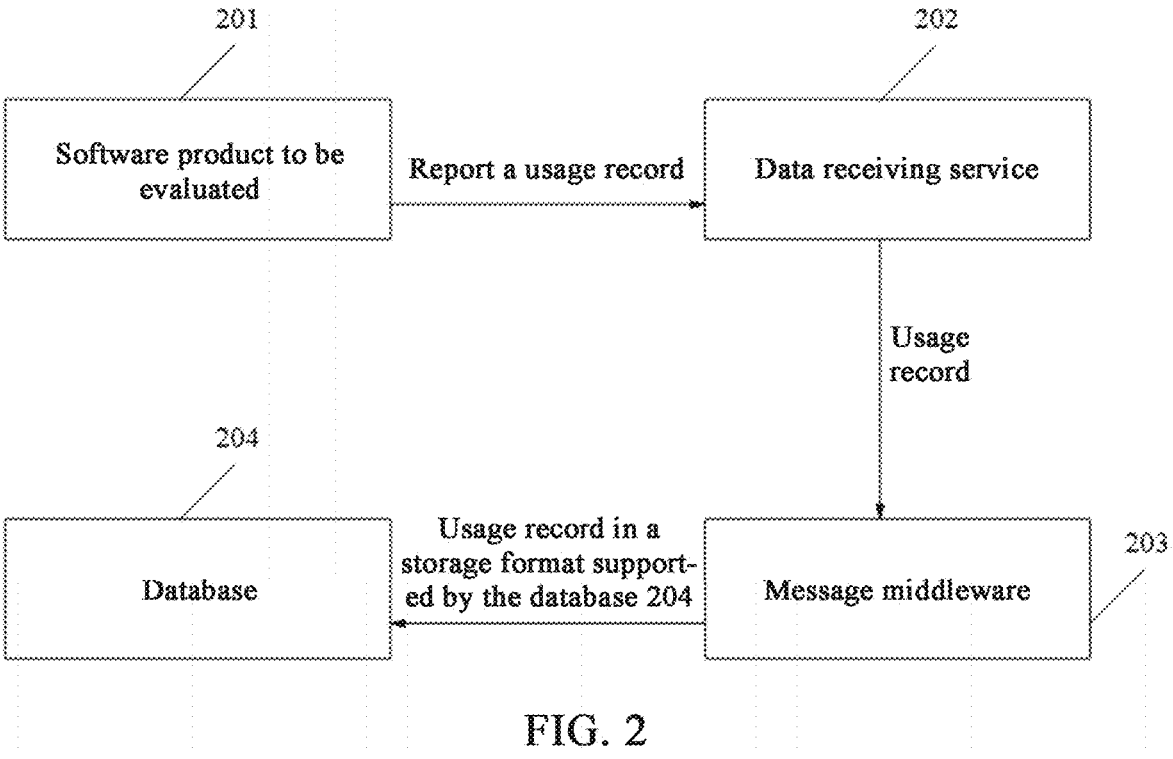
FIG. 2 is a schematic process diagram of a data storage method provided in an embodiment of the present application.
FIG. 3 is a schematic diagram of a data storage format provided in an embodiment of the present application.

To enable those skilled in the art to better understand the solutions of the present application, a clear and complete description of the technical solutions in the embodiments of the present application will be given below, in combination with the drawings in the embodiments of the present application. Apparently, the embodiments described below are merely a part, but not all, of the embodiments of the present application. All of other embodiments, obtained by those ordinary skilled in the art based on the embodiments in the present application without any creative effort, fall into the protection scope of the present application.

The inventor of the present application has discovered by researches that currently, when a health degree of a software product to be evaluated is evaluated, the health degree of the software product to be evaluated may be determined in combination with the number of visitors of a web page provided by the software product to be evaluated. However, an evaluation result obtained in this manner is inaccurate. For example, the software product to be evaluated is provided for an enterprise client A for use, the number of employees included by the enterprise client A is relatively small, in this case, even if each employee uses the software product to be evaluated, the number of visitors is relatively small, and correspondingly, a health degree determined based on the number of visitors is relatively poor. However, each employee of the enterprise client A uses the software product to be evaluated in practice, and the health degree of the software product to be evaluated is actually good.

To solve the above problems, embodiments of the present application provide a health degree evaluation method and apparatus of a software product, which may accurately determine the health degree of the software product to be evaluated based on a plurality of parameters of the target clients using the software product to be evaluated.

Various non-limiting implementations of the present application are described in detail below with reference to the drawings.

Exemplary Method

Referring to FIG. 1, it is a schematic flowchart of a health degree evaluation method of a software product provided in an embodiment of the present application.

The health degree evaluation method of the software product provided in the embodiment of the present application may be applied to a server, for example, may be applied to a health degree evaluation service deployed in the server.

In the present embodiment, the method may include, for example, the following steps: S101 to S102.

S101: obtaining usage parameters of using a software product to be evaluated by target clients, wherein the usage parameters includes at least two of a usage depth parameter, a usage breadth parameter and a usage frequency parameter, the usage depth parameter is determined according to conditions of usage by the target clients of functions of the software product to be evaluated, and the usage breadth parameter is determined according to the number of users who use the software product to be evaluated in the target client, and the usage frequency parameter is determined according to a frequency of the target clients using the software product to be evaluated.

In the embodiment of the present application, the target clients may be, for example, a group user, for example, an enterprise user. The software product to be evaluated may be, for example, a SaaS application, and of course, may also be another software product other than the SaaS application. The usage parameters of using the software product to be evaluated by target clients may reflect the usage condition of the target clients using the software product to be evaluated.

In one example, the usage parameters may include at least two of the usage depth parameter, the usage breadth parameter and the usage frequency parameter.

In the embodiment of the present application, the usage depth parameter is used for indicating a depth of the target clients using the software product to be evaluated.

As one example, the usage depth parameter may be determined according to usage conditions of the target clients for functions provided by software product to be evaluated.

As one specific example, the usage depth parameter may be determined according to the number of functions that have been used by the target clients in the functions provided by the software product to be evaluated, for example, a correspondence between a number interval and the usage depth parameter is preset, and then the usage depth parameter is obtained according to a number interval where the number of functions that have been used by the target clients is located, and the correspondence. For example, the foregoing correspondence may be shown in Table 1 below, it is assumed that the number of functions that have been used by the target clients is 7, and it is determined that the usage depth parameter is 0.8 or 80.

TABLE 1

| Number interval | Usage depth parameter |
| --- | --- |
| 1-3 | 0.3 (or 30) |
| 3-5 | 0.5 (or 50) |
| 6-8 | 0.8 (or 80) |
| 9-10 | 1.0 (or 100) |

As another specific example, the usage depth parameter may be determined according to a ratio of the functions that have been used by the target clients to the functions provided by the software product to be evaluated. For example, the usage depth parameter may be equal to the ratio, and as another example, the usage depth parameter may be a product of the ratio and a specific value (e.g., 100). For example, the software product to be evaluated provides 10 functions, and the target clients uses 8 functions among the 10 functions, then the usage depth parameter may be 0.8 or 80. In this case, the determined usage depth parameter is more accurate than the usage depth parameter determined by using the correspondence.

As another specific example, for the functions provided by the software product to be evaluated, considering that degrees of importance thereof may be different, therefore a corresponding weight may be set for each function. Correspondingly, when the usage depth parameter is determined, the usage depth parameter may be determined in combination with the functions that have been used by the target client, and the weights of the functions that have been used by the target client. For example, summation may be performed on the weights of the functions that have been used by the target clients to obtain the usage depth parameter. In other words, each of the functions provided by the software product to be evaluated is set with a corresponding weight, and the usage depth parameter may be determined according to the functions that have been used by the target clients in the functions provided by the software product to be evaluated, and the weights of the functions that have been used by the target client.

As still another specific example, the usage depth parameter may be determined in combination with operations executed by the target clients for the functions that have been used by the target client, for example, an operation supported by each of the functions provided by the software product to be evaluated is set with a corresponding weight, and summation is performed on the weights of the operations executed by the target clients to obtain the usage depth parameter. In other words, an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

In the embodiment of the present application, the usage breadth parameter is used for indicating a breadth of the target clients using the software product to be evaluated, the so-called breadth may be understood as a user usage range, or be understood as a usage condition of the software product to be evaluated in a target user corresponding to the target client.

As one example, the usage breadth parameter may be determined according to the number of users who use the software product to be evaluated in the target client.

In one specific example, the usage breadth parameter may be the number of users who actually use the software product to be evaluated in the target client.

In yet another specific example, the usage breadth parameter may be determined according to a ratio of the number of users who actually use the software product to be evaluated in the target clients to the total number of users who are able to use the software product to be evaluated in the target client. For example, the usage depth parameter may be equal to the ratio, and as another example, the usage depth parameter may be a product of the ratio and a specific value (e.g., 100).

In one example, the number of users who actually use the software product to be evaluated in the target clients may be the number of users who use the software product to be evaluated within a first time period (e.g., one or two weeks).

In one example, the total number of users, for example, may be the number of accounts registered by the target clients and corresponding to the software product to be evaluated. In yet another example, considering that an internal organization structure of the target clients may be changed, for example, a new department is built, a new employee is recruited, and the like. However, even if so, the users who are able to use the software product to be evaluated in the target clients generally use the software product to be evaluated within a certain period of time. For example, generally, the users who are able to use the software product to be evaluated in the target clients use the software product to be evaluated at least once within 60 days. Therefore, the total number of users may be the number of users who actually use the software product to be evaluated in the target clients within a second time period. A duration corresponding to the second time period mentioned herein is greater than a duration corresponding to the foregoing first time period, for example, the first time period is nearly two weeks, and the second time period is approximately 60 days. In this way, when the organization structure of the target clients is adjusted, the usage breadth parameter may also be accurately determined.

In the embodiment of the present application, the usage frequency parameter is used for indicating a frequency of the target clients using the software product to be evaluated. In other words, the usage frequency parameter may be determined according to a frequency of the target clients using the software product to be evaluated.

In one specific example, the usage frequency parameter may be determined, for example, according to a per capita usage frequency of the software product to be evaluated within a certain period of time.

In yet another specific example, the usage frequency parameter may be determined according to the number of days when the target clients actually uses the software product to be evaluated within a third time period. In the embodiment of the present application, the third time period is not specifically limited, the third time period may be determined according to actual situations, and the third time period may be, for example, nearly two weeks. In one specific example, the usage frequency parameter may be determined according to the number of days when the target clients actually use the software product to be evaluated within the third time period, and a preset threshold of the number of days. As one example, the preset threshold of the number of days may be the number of days included in the third time period; and as another example, the preset threshold of the number of days may be the number of workdays included within the third time period. Now, it is taken as an example for description that the preset threshold of the number of days may be the number of workdays included within the third time period:

assuming that the third time period is nearly two weeks, if the number of days when the target clients uses the software product to be evaluated within the nearly two weeks is 9 days, and the number of workdays included within the third time period is 10 days, then the usage frequency parameter is 0.9 or 90.

Compared with the manner of determining the usage frequency parameter according to the per capita usage frequency of the software product to be evaluated within a certain period of time, the manner of determining the usage frequency parameter according to the ratio of the number of days when the target clients actually use the software product to be evaluated within the third time period to the preset threshold of the number of days has a simpler and high-efficiency determination mode.

In one example, during specific implementation of S101, a target usage record of the target clients using the software product to be evaluated may be obtained from usage records of the target clients using the software product to be evaluated, and the usage parameters is further determined based on the target usage record. In one specific example, the target usage record may be obtained from a database, wherein:

the usage record may include, for example, the following information: a user identifier, a usage time, a software product identifier, a function identifier, and a usage action. Specifically:

the user identifier is used for identifying a user who uses the software product to be evaluated, and the target enterprise may have a plurality of users who are able to use the software product to be evaluated.

The usage time is used for identifying a time when the user uses the software product to be evaluated, and in one example, the usage time may be a timestamp corresponding to a moment within a time period when the user uses the software product to be evaluated.

The software product identifier is used for identifying the software product to be evaluated, and the software product identifier may be, for example, a name of the software product to be evaluated.

The function identifier is used for identifying a function currently used by the user, wherein the software product to be evaluated may provide a plurality of functions, and the function identifier may be, for example, a function name.

The usage action is used for identifying a specific usage action of the user when uses the software product to be evaluated currently, and the usage action includes, but is not limited to, browsing, creating a file, and the like.

The database may be, for example, a column database, which is not specifically limited in the embodiment of the present application. The database may store the usage records of the target clients using the software product to be evaluated. In other words, in one example, before executing S101, the server may further store, in the database, the usage records of the target clients using the software product to be evaluated. Regarding the specific implementation of the server storing, in the database, the usage records of the target clients using the software product to be evaluated, reference may be made to related description in FIG. 2, and details are not described herein again.

S102: determining a health degree of the software product to be evaluated according to the usage parameters.

After the usage parameters is determined, the health degree of the software product to be evaluated may be determined according to the usage parameters.

As described above, the usage parameters may include at least two parameters, and in one example, the health degree of the software product to be evaluated may be determined according to a parameter with a greater value in the at least two parameters. For example, the parameter with the greater value in the at least two parameters may be determined as a health degree score of the software product to be evaluated.

In yet another example, each parameter in the usage parameters may have a corresponding weight separately, and correspondingly, during the specific implementation of S102, weighted summation may be performed on respective parameters included in the usage parameters to obtain a health degree score of the software product to be evaluated, so that the obtained health degree score comprehensively considers the at least two parameters, and thus the obtained health degree score is more accurate. For example:

assuming that the usage parameters includes the usage depth parameter, the usage breadth parameter and the usage frequency parameter, and the weights of the usage depth parameter, the usage breadth parameter and the usage frequency parameter are respectively: 0.3, 0.4 and 0.3, then the health degree score may be:

$$0.3*\text{usage depth parameter}+0.4*\text{usage breadth parameter}+0.3*\text{usage frequency parameter.}$$

Regarding the health degree score, it should be noted that the health degree score of the software product to be evaluated is used for indicating the health degree of the software product to be evaluated, and in one example, the higher the health degree score, the higher the health degree of the software product to be evaluated is.

As can be seen from the above description, by using the solutions of the embodiment of the present application, the health degree of the software product to be evaluated may be determined by using at least two of the usage depth parameter, the usage breadth parameter and the usage frequency parameter, so that the determined health degree is more accurate.

In one example, in order to further improve the accuracy of the determined health degree of the software product to be evaluated. When the health degree of the software product to be evaluated is determined, other auxiliary parameters may also be combined in addition to the foregoing usage parameters of the software product to be evaluated used by the target client. In one specific example, considering that a satisfaction degree of the target clients to the software product to be evaluated, a service-level agreement (SLA) of the software product to be evaluated, and a consultation amount of consulting the software product to be evaluated by the target clients may also reflect the health degree of the software product to be evaluated, therefore the foregoing auxiliary information may include at least one of the satisfaction degree, the SLA and the consultation amount, wherein:

the satisfaction degree of the target clients to the software product to be evaluated may be reflected as a score of the target clients to the software product to be evaluated, for example, the score of the target clients to the software product to be evaluated may be obtained by providing a questionnaire for the target client.

The SLA may be obtained according to performance parameters of the software product to be evaluated, and in one specific example, the performance parameters of the software product to be evaluated may be counted, and the SLA is obtained according to the performance parameters. The performance parameters and the statistical manner of the software product to be evaluated are not specifically limited in the embodiment of the present application, and an implementation of obtaining the SLA according to the performance parameters is not specifically limited in the embodiment of the present application.

In one specific example, when the health degree of the software product to be evaluated is determined according to the foregoing usage parameters and the auxiliary parameter, weighted summation may be performed on respective parameters included in the usage parameters and parameters included in the auxiliary parameter, so as to obtain the health degree of the software product to be evaluated. The weight of each of the plurality of parameters included in the usage parameters and the weight of each parameter included the auxiliary parameter may be set according to actual situations, which is not specifically limited in the embodiment of the present application.

Next, with reference to FIG. 2, an implementation of storing, in the database, the usage record of the target clients using the software product to be evaluated is described.

Referring to FIG. 2, it is a schematic process diagram of a data storage method provided in an embodiment of the present application.

As shown in FIG. 2, a software product 201 to be evaluated may report its own usage record to a data receiving service 202. The data receiving service 202 may be understood as a functional module capable of receiving data. In one example, the data receiving service 202 transfers the usage record to a message middleware 203, and the message middleware 203 converts the received usage record into a storage format supported by a database 204, and stores the usage record with the converted format in the database 204.

In one example, the foregoing storage format supported by the database may be shown in FIG. 3, and FIG. 3 is a schematic diagram of a data storage format provided in an embodiment of the present application.

As shown in FIG. 3, the data storage format includes the following fields:

a software product name (APP name), a character type of which is a character string, and a default value of which is an empty character string;

a user identifier (user id), a character type of which is a character string, and a default value of which is an empty character string;

a module, configured to indicate a certain function provided by the software product to be evaluated, a character type of which is a character string, and a default value of which is an empty character string;

a usage time, indicating a moment at which a user starts to use the software product to be evaluated, and a character type of which is a 64-bit unsigned integer; and a usage action, a character type of which is a character string.

"comment" in FIG. 3 indicates a comment, and content behind the comment is used for explaining the meaning of the field.

In one example, when the foregoing usage record is stored in the database, other additional information may also be stored in the database to facilitate subsequent execution of a related operation based on the additional information. For example, reporting time information may also be stored in the database, and the reporting time information indicates a time when the software product 201 to be evaluated may report the usage record to the data receiving service 202. In one example, by comparing the reporting time information with the foregoing usage time, it is determined whether there is a network problem when the user uses the software product 201 to be evaluated, or it is determined whether a duration of using the software product 201 to be evaluated by a user is less than a specific duration. As another example, date information may also be extracted from the foregoing usage information, and the date information is stored to facilitate subsequent reading of a corresponding usage record from the database 204 with the date information as an index.

Exemplary Device

Based on the method provided in the above embodiment, an embodiment of the present application further provides an apparatus, and the apparatus is described below with reference to the drawings.

Figure 4:
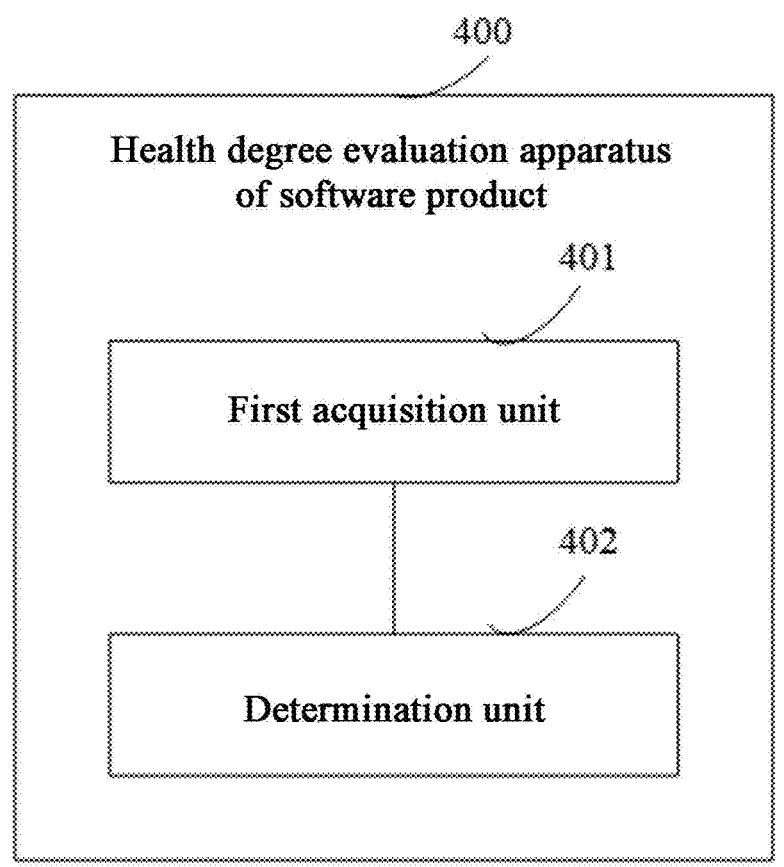
FIG. 4 is a schematic structural diagram of a health degree evaluation apparatus of a software product provided in an embodiment of the present application.

Referring to FIG. 4, it is a schematic structural diagram of a health degree evaluation apparatus of a software product provided in an embodiment of the present application. For example, the apparatus 400 may specifically include a first acquisition unit 401 and a determination unit 402.

the first acquisition unit 401 is configured to obtain usage parameters of using a software product to be evaluated by target clients, wherein the usage parameters includes at least two of a usage depth parameter, a usage breadth parameter and a usage frequency parameter, the usage depth parameter is determined according to conditions of usage by the target clients of functions of the software product to be evaluated, the usage breadth parameter is determined according to the number of users who use the software product to be evaluated in the target client, and the usage frequency parameter is determined according to a frequency of the target clients using the software product to be evaluated; and the determination unit 402 is configured to determine a health degree of the software product to be evaluated according to the usage parameters.

Optionally, the usage depth parameter is determined according to a ratio of functions that have been used by the target clients to functions provided by the software product to be evaluated.

Optionally, each of the functions provided by the software product to be evaluated is set with a corresponding weight, and the usage depth parameter is determined according to the functions that have been used by the target clients in the functions provided by the software product to be evaluated, and the weights of the functions that have been used by the target client.

Optionally, an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

Optionally, the usage breadth parameter is determined according to a ratio of the number of users who actually use the software product to be evaluated in the target clients to the total number of users who are able to use the software product to be evaluated in the target client.

Optionally, the number of users is the number of users who actually use the software product to be evaluated in the target clients within a first time period, the total number of users is the number of users who actually use the software product to be evaluated in the target clients within a second time period, and a duration corresponding to the first time period is less than a duration corresponding to the second time period.

Optionally, the usage frequency parameter is determined according to the number of days when the target clients actually uses the software product to be evaluated within a third time period.

Optionally, the determination unit 402 is configured to:

perform weighted summation on respective parameters included in the usage parameters to obtain a health degree score of the software product to be evaluated.

Optionally, the apparatus further includes:

a receiving unit, configured to receive a usage record of the target clients using the software product to be evaluated, which is reported by the software product to be evaluated, and convert the usage record into a storage format supported by a database, so as to store the usage record in the database;

wherein the first acquisition unit 401 is configured to:

obtain, from the database, a target usage record of the target clients using the software product to be evaluated, wherein the target usage record is some or all usage records stored in the database; and

obtain the usage parameters of the software product to be evaluated according to the target usage record.

Optionally, the apparatus further includes:

a second acquisition unit, configured to obtain one or more of a satisfaction degree of the target clients to the software product to be evaluated, a service-level agreement of the software product to be evaluated, and a consultation amount of consulting the software product to be evaluated by the target client, wherein the determination unit 402 is configured to:

determine the health degree of the software product to be evaluated according to the usage parameters, and one or more of the satisfaction degree of the target clients to the software product to be evaluated, the service-level agreement of the software product to be evaluated, and the consultation amount of consulting the software product to be evaluated by the target client.

Since the apparatus 400 is an apparatus corresponding to the data processing method provided in the above method embodiments, the specific implementation of each unit of the apparatus 400 is the same concept as the above method embodiments, therefore for a specific implementation of each unit of the apparatus 400, reference may be made to related description of the above method embodiments, and details are not described herein again.

An embodiment of the present application provides an electronic device, including a processor and a memory, wherein, the processor is configured to execute an instruction stored in the memory, so that the device is caused to execute the health degree evaluation method of the software product provided in the above method embodiments.

An embodiment of the present application provides a computer-readable storage medium, including an instruction, wherein the instruction instructs a device to execute the health degree evaluation method of the software product provided in the above method embodiments.

An embodiment of the present application further provides a computer program product, wherein when the computer program product runs on a computer, the computer is caused to execute the health degree evaluation method of the software product provided in the above method embodiments.

Other implementation solutions of the present application will be apparent to those skilled in the art from consideration of the specification and practice of the disclosure disclosed herein. The present application is intended to cover any variations, uses or adaptations of the present application, and these variations, uses or adaptations follow general principles of the present application and include common knowledge or customary technical means in the art that are not disclosed in the present disclosure. The specification and embodiments are considered as exemplary only, and a true scope and spirit of the present application are indicated by the following claims.

It should be understood that the present application is not limited to precise structures that have been described above and shown in the drawings, and various modifications and changes may be made without departing from the scope thereof. The scope of the present application is only limited by the appended claims.

The above descriptions are only preferred embodiments of the present application and are not intended to limit the present application, and any modifications, equivalent replacements, improvements, and the like, made within the spirit and principles of the present application, shall fall within the protection scope of the present application.

The invention claimed is:

1. A health degree evaluation method of a software product, executed by one or more processors of a server, comprising:

receiving a message of a usage record of target clients using the software product to be evaluated which is reported by the software product to be evaluated, wherein the usage record comprises a user identifier, a usage time, a software product identifier, a function identifier, and a usage action, and the usage action comprises browsing and creating a file, and the target clients are a group user;

converting the usage record into a storage format supported by a database, so as to store the usage record in the database, wherein the storage format comprises fields with a character type of character string corresponding to the usage record;

obtaining, from the database, a target usage record of the target clients using the software product to be evaluated, wherein the target usage record is some or all usage records stored in the database;

determining usage parameters of the software product to be evaluated according to the target usage record, wherein the usage parameters comprise at least two of a usage depth parameter, a usage breadth parameter, and a usage frequency parameter, wherein the usage depth parameter is determined according to conditions of usage by the target clients of functions of the software product to be evaluated, the usage breadth parameter is determined according to a number of users in the target clients who use the software product to be evaluated, and the usage frequency parameter is determined according to a frequency of the target clients using the software product to be evaluated;

determining a health degree score of the software product to be evaluated according to the usage parameters, the health degree score being obtained by performing a weighted summation on respective parameters included in the usage parameters so that the health degree score is determined from actual usage records stored in the database; and evaluating operation conditions of the software product and optimizing the software product based on the health degree score of the software product being smaller than a threshold, wherein the software product comprises software as a service (Saas) applications providing software services for enterprises.

2. The method according to claim 1, wherein the usage depth parameter is determined according to a ratio of functions that have been used by the target clients to functions provided by the software product to be evaluated.

3. The method according to claim 1, wherein each of the functions provided by the software product to be evaluated is set with a corresponding weight, and the usage depth parameter is determined according to the functions that have been used by the target clients in the functions provided by the software product to be evaluated, and the weights of the functions that have been used by the target clients.

4. The method according to claim 1, wherein an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

5. The method according to claim 1, wherein the usage breadth parameter is determined according to a ratio of a number of users who actually use the software product to be evaluated in the target clients to a total number of users who are able to use the software product to be evaluated in the target clients.

6. The method according to claim 5, wherein the number of users is a number of users who actually use the software product to be evaluated in the target clients within a first time period, the total number of users is a number of users who actually use the software product to be evaluated in the target clients within a second time period, and a duration corresponding to the first time period is less than a duration corresponding to the second time period.

7. The method according to claim 1, wherein the usage frequency parameter is determined according to a number of days when the target clients actually use the software product to be evaluated within a third time period.

8. The method according to claim 1, further comprising:
obtaining one or more of a satisfaction degree of the target clients to the software product to be evaluated, a service-level agreement of the software product to be evaluated, and a consultation amount of consulting the software product to be evaluated by the target clients, wherein determining the health degree score of the software product to be evaluated according to the usage parameters comprises:
determining the health degree score of the software product to be evaluated according to the usage parameters, and one or more of the satisfaction degree of the target clients to the software product to be evaluated, the service-level agreement of the software product to be evaluated, and the consultation amount of consulting the software product to be evaluated by the target client.

9. The method according to claim 1, wherein the software product to be evaluated is configured to report the usage record to a data receiving service configured to receive data, the data receiving service is configured to transfer the usage record to a message middleware, and the message middleware is configured to convert the received usage record into the storage format supported by the database and store the usage record with the converted format in the database.

10. An electronic device, comprising a processor and a memory, wherein,
the processor is configured to execute an instruction stored in the memory, so as to cause the device to:
receive a message of a usage record of target clients using software product to be evaluated which is reported by the software product to be evaluated, wherein the usage record comprises a user identifier, a usage time, a software product identifier, a function identifier, and a usage action, and the usage action comprises browsing and creating a file and the target clients are a group user;
convert the usage record into a storage format supported by a database, so as to store the usage record in the database, wherein the storage format comprises fields with a character type of character string corresponding to the usage record;
obtain, from the database, a target usage record of the target clients using the software product to be evaluated, wherein the target usage record is some or all usage records stored in the database;
determine usage parameters of the software product to be evaluated according to the target usage record, wherein the usage parameters comprise at least two of a usage depth parameter, a usage breadth parameter, and a usage frequency parameter, wherein the usage depth parameter is determined according to conditions of usage by the target clients of functions of the software product to be evaluated, the usage breadth parameter is determined according to a number of users in the target clients who use the software product to be evaluated, and the usage frequency parameter is determined according to a frequency of the target clients using the software product to be evaluated;
determine a health degree score of the software product to be evaluated according to the usage parameters, the health degree score being obtained by performing a weighted summation on respective parameters included in the usage parameters so that the health degree score is determined from actual usage records stored in the database; and
evaluate operation conditions of the software product and optimize the software product based on the health degree score of the software product being smaller than a threshold, wherein the software product comprises software as a service (Saas) applications providing software services for enterprises.

11. The electronic device according to claim 10, wherein the usage depth parameter is determined according to a ratio of functions that have been used by the target clients to functions provided by the software product to be evaluated.

12. The electronic device according to claim 10, wherein each of the functions provided by the software product to be evaluated is set with a corresponding weight, and the usage depth parameter is determined according to the functions that have been used by the target clients in the functions provided by the software product to be evaluated, and the weights of the functions that have been used by the target clients.

13. The electronic device according to claim 10, wherein an operation supported by each of the functions provided by the software product to be evaluated is set with a corresponding weight, and the usage depth parameter is determined according to operations executed by the target clients for the used functions in the functions provided by the software product to be evaluated, and the weights corresponding to the operations.

14. The electronic device according to claim 10, wherein the usage breadth parameter is determined according to a ratio of a number of users who actually use the software product to be evaluated in the target clients to a total number of users who are able to use the software product to be evaluated in the target clients.

15. The electronic device according to claim 14, wherein the number of users is a number of users who actually use the software product to be evaluated in the target clients within a first time period, the total number of users is a number of users who actually use the software product to be evaluated in the target clients within a second time period, and a duration corresponding to the first time period is less than a duration corresponding to the second time period.

16. The electronic device according to claim 10, wherein the usage frequency parameter is determined according to a number of days when the target clients actually use the software product to be evaluated within a third time period.

17. A non-transitory computer-readable storage medium, comprising an instruction executed by one or more processors of a server, wherein the instruction instructs a device to:
receive a message of a usage record of target clients using software product to be evaluated which is reported by the software product to be evaluated, wherein the usage record comprises a user identifier, a usage time, a software product identifier, a function identifier, and a usage action, and the usage action comprises browsing and creating a file and the target clients are a group user;

convert the usage record into a storage format supported by a database, so as to store the usage record in the database, wherein the storage format comprises fields with a character type of character string corresponding to the usage record;

obtain, from the database, a target usage record of the target clients using the software product to be evaluated, wherein the target usage record is some or all usage records stored in the database;

determine usage parameters of the software product to be evaluated according to the target usage record, wherein the usage parameters comprise at least two of a usage depth parameter, a usage breadth parameter, and a usage frequency parameter, wherein the usage depth parameter is determined according to conditions of usage by the target clients of functions of the software product to be evaluated, the usage breadth parameter is determined according to a number of users in the target clients who use the software product to be evaluated, and the usage frequency parameter is determined according to a frequency of the target clients using the software product to be evaluated;

determine a health degree score of the software product to be evaluated according to the usage parameters, the health degree score being obtained by performing a weighted summation on respective parameters included in the usage parameters so that the health degree score is determined from actual usage records stored in the database; and evaluate operation conditions of the software product and optimize the software product based on the health degree score of the software product being smaller than a threshold, wherein the software product comprises software as a service (Saas) applications providing software services for enterprises.

18. The electronic device according to claim 10, wherein the software product to be evaluated is configured to report the usage record to a data receiving service configured to receive data, the data receiving service is configured to transfer the usage record to a message middleware, and the message middleware is configured to convert the received usage record into the storage format supported by the database and store the usage record with the converted format in the database.

* * * * *